United States Patent [19]
Wittstock et al.

[11] Patent Number: 6,054,045
[45] Date of Patent: Apr. 25, 2000

[54] SKIMMER FILTERS FOR PONDS

[75] Inventors: Gary G. Wittstock, Elburn, Ill.; John M. Menhart, Sewickley, Pa.; David B. Duensing, Yorkville, Ill.

[73] Assignee: Pond Supplies of America, Inc., Ill.

[21] Appl. No.: 09/079,584

[22] Filed: May 15, 1998

Related U.S. Application Data

[60] Provisional application No. 60/046,607, May 15, 1997.

[51] Int. Cl.[7] ................................................. B01D 21/04
[52] U.S. Cl. .................. 210/169; 210/242.1; 210/416.2; 210/483
[58] Field of Search ..................................... 210/155, 162, 210/169, 258, 259, 416.2, 483, 488, 489, 242.1

[56] References Cited

U.S. PATENT DOCUMENTS

| | | | |
|---|---|---|---|
| 2,996,189 | 8/1961 | Salterbach | 210/155 |
| 3,067,879 | 12/1962 | Baker | 210/169 |
| 3,252,576 | 5/1966 | Miller | 210/169 |
| 3,428,178 | 2/1969 | Naoh | 210/169 |
| 3,508,661 | 4/1970 | Diemond et al. | 210/169 |
| 3,513,978 | 5/1970 | Newsteder | 210/169 |
| 4,498,984 | 2/1985 | Colson | 210/169 |
| 4,783,258 | 11/1988 | Willinger et al. | 210/416.2 |
| 5,242,582 | 9/1993 | Marioni | 210/169 |
| 5,518,611 | 5/1996 | Bresoli | 210/416.2 |
| 5,584,991 | 12/1996 | Wittstock . | |

OTHER PUBLICATIONS

Art Rooze, Water Gardens The FAmily Handy man Ask Handyman The Family man Jan. 1991.
Stuart Shuck Surface Skimming Systems Dec. 1996.
Pond Water Clairty Pondscapes May 1994.
John Tinius Why isMy Water Green KOI USA Jul./Aug. 1994.
Rom Beville, One Man's Solution to Green Water KOI USA.
Lynne Hudson A Pond of My Own Aquarium Fish Magazing Jul. 1994.

*Primary Examiner*—Christopher Upton
*Attorney, Agent, or Firm*—Patnaude & Videbeck

[57] ABSTRACT

A skimmer filter assembly includes a hollow skimmer box including therein an accordion pleat weir-type water inlet, substantially vertically positioned filter mats and a submersible or external water pump positioned at the rear of the skimmer box. A filter mat holder and dirty sump retain the filter mats in a stable, slightly off vertical position and provide for removal of the dirty sump without repositioning the weir or water pump. The water pump is positioned in a portion of the skimmer box which is not vertically restricted, thus allowing multiple size water pumps to be utilized in their standard upright position without removing the mats to make room for large pumps and providing for servicing or removal of the pumps without disturbing the filter mats the filter mat holder, the dirty sump or the water inlet weir.

12 Claims, 6 Drawing Sheets

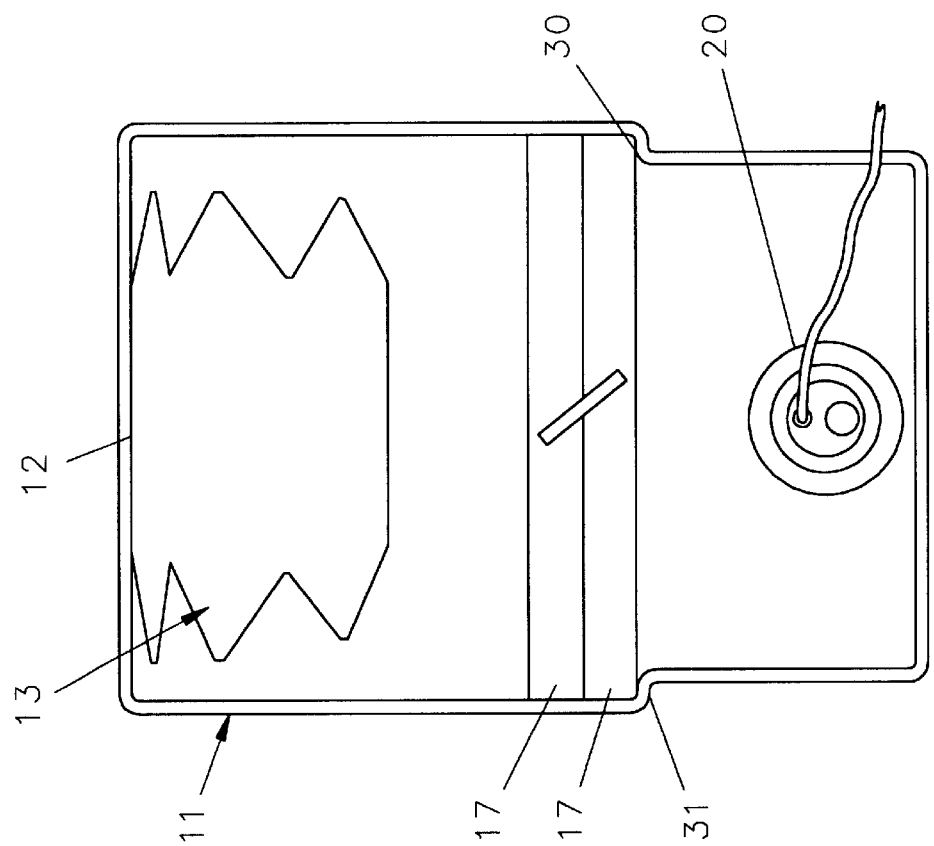
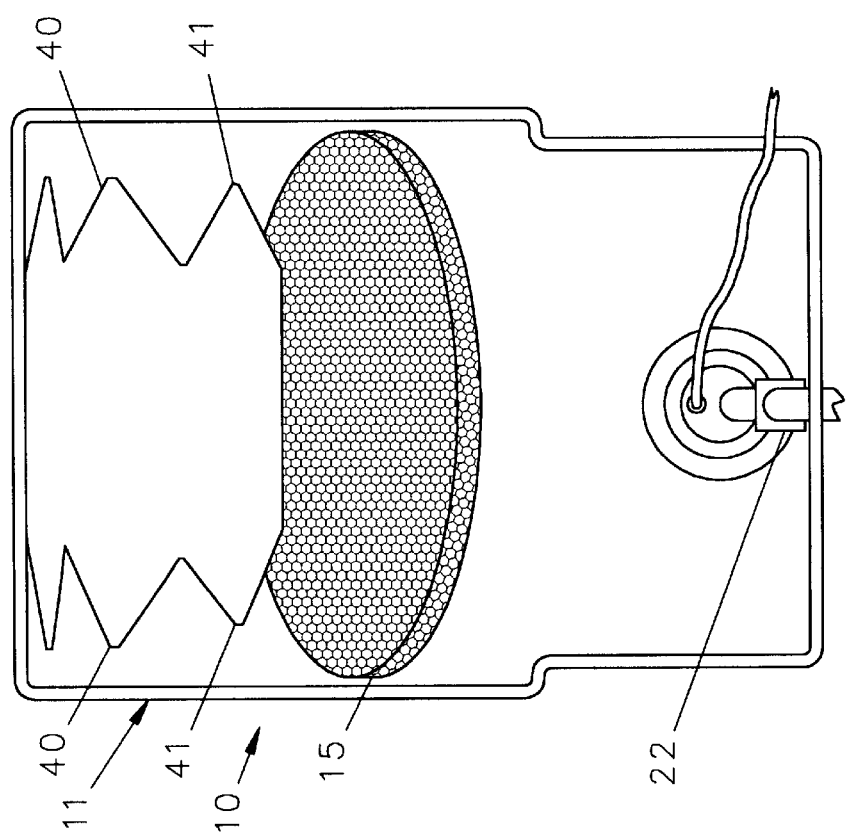

SKIMMER FILTERS FOR PONDS

This application claims priority of provisional application Ser. No. 60/046,607 filed May 15, 1997 and is a continuation-in-part thereof.

FIELD OF THE INVENTION

The present invention relates generally to skimmer filtration assemblies for outdoor ponds and, more particularly, to an improved skimmer filtration assembly that provides improved, more efficient skimming action, ease of cleaning or changing filters and servicing or changing water pumps in the skimmer filter box without the necessity of removing other equipment from the filter box.

BACKGROUND OF THE INVENTION

Garden ponds have been considered desirable by garden owners since before Claude Monet's Gardens at Giverny, France. However, with the advent of fish-safe EPDM (ethylene propylene diene monomer) 14 of roofing liner material that can be formed into any convenient shape, and covered with rock strata, natural looking garden ponds with recirculating water have become a popular landscape feature. In a previous patent, U.S. Pat. No. 5,584,991, a typical landscape garden pond is shown including an aeration-providing waterfall at a high end of the pond, and a skimmer-type filter at an opposing lower end of the pond. The skimmer filter includes various types of large and small debris removal equipment and a media to support the growth of nutrient consuming bacteria colonies, which reduce algae by removing pond nutrients, thus starving algae of its food source. Additionally, a pump recirculates water back up to the high end of the pond. Such a garden pond easily facilitates the growth of water lilies, water hyacinths, etc. and provides clear non-chemically treated filtered water for the survival and healthy living of gold fish, Japanese koi, frogs and the like.

Since the time of the filing of the application which became U.S. Pat. No. 5,584,991, we have discovered that improvements could and should be made to the skimmer filter used in garden ponds. For example, in the skimmer filter disclosed in the previous patent, a large sack-like net connected to the water inlet opening of the filter box must be removed if either the biological filter elements or the water pump are to be serviced. Also, no specific provision assures that all water must proceed over the weir. Likewise, since the filter mats disclosed therein are positioned in a horizontal stacked configuration in the middle of the skimmer box. Servicing or replacement of the water pump positioned below the filter mats requires the removal from the skimmer box of all filter mats.

It is, therefore, an object of the present invention, generally stated, to provide an improved skimmer filter for a garden pond that includes distinct functions thereof which may be serviced or replaced without removing or discontinuing other distinct functions of the skimmer filter.

It is a further object of the present invention to provide an improved skimmer filter for a garden pond wherein water flowing into the skimmer box does not bypass the weir.

Another object of the present invention is to provide an improved skimmer filter for a garden pond that may be cleaned by draining the skimmer box completely and then turning off the water pump.

A still further object of the present invention is the provision of an improved skimmer filter including an improved pond drain having an opening adjacent the deepest portion of a pond and an exit into the skimmer filter.

SUMMARY OF THE INVENTION

An improved skimmer filter assembly of the present invention includes a generally hollow substantially rectangular box structure including a rear portion which is divided from the front portion thereof by a filter mat support arrangement. The front portion thereof includes a water inlet opening covered by a weir. The weir sides are connected to the box by an accordion pleat type weir hinge assembly that governs the inflow of water into the skimmer filter forcing all water over the top of the weir to optimize surface skimming action. The filter mats are positioned intermediately in the skimmer filter box in a stable slightly off vertical position for filtering water flow from the front portion of the skimmer filter to the rear portion of the skimmer box. The rear portion of the skimmer box is vertically unobstructed for providing for servicing or removal of a water pump without disturbing the remainder of items in the skimmer box.

BRIEF DESCRIPTION OF THE DRAWINGS

The features of the present invention, which are believed to be novel, are set forth with particularity in the appended claims. The invention may best be understood from the following detailed description of a currently preferred embodiment thereof taken in conjunction with the accompanying drawings wherein like numerals refer to like parts, and in which:

FIG. 5 is a perspective view looking at the top of the skimmer box showing the relative positioning of the skimmer bellows weir, the large net-like bag, the water pump and exit piping therefor;

FIG. 6 is a perspective view of the skimmer box with the pump exit plumbing and large bag-like net removed to show the placement of two biological filter mats in the skimmer box.

DETAILED DESCRIPTION OF THE PREFERRED EMBODIMENTS

Figure 1:
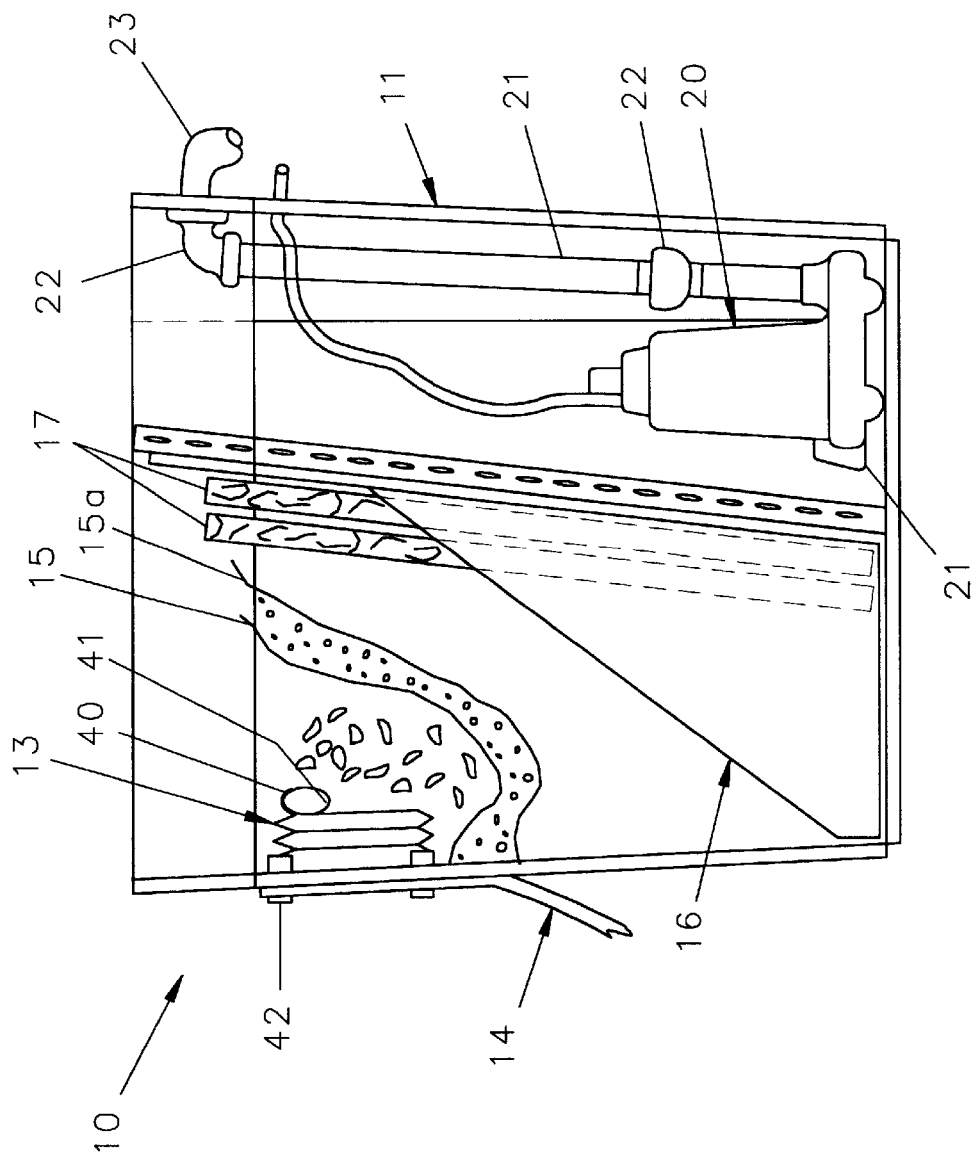
FIG. 1 is a side elevational view in section of a skimmer filter constructed in accordance with the present invention, particularly showing the separability of the differing functions of the skimmer filter.
Figure 2:
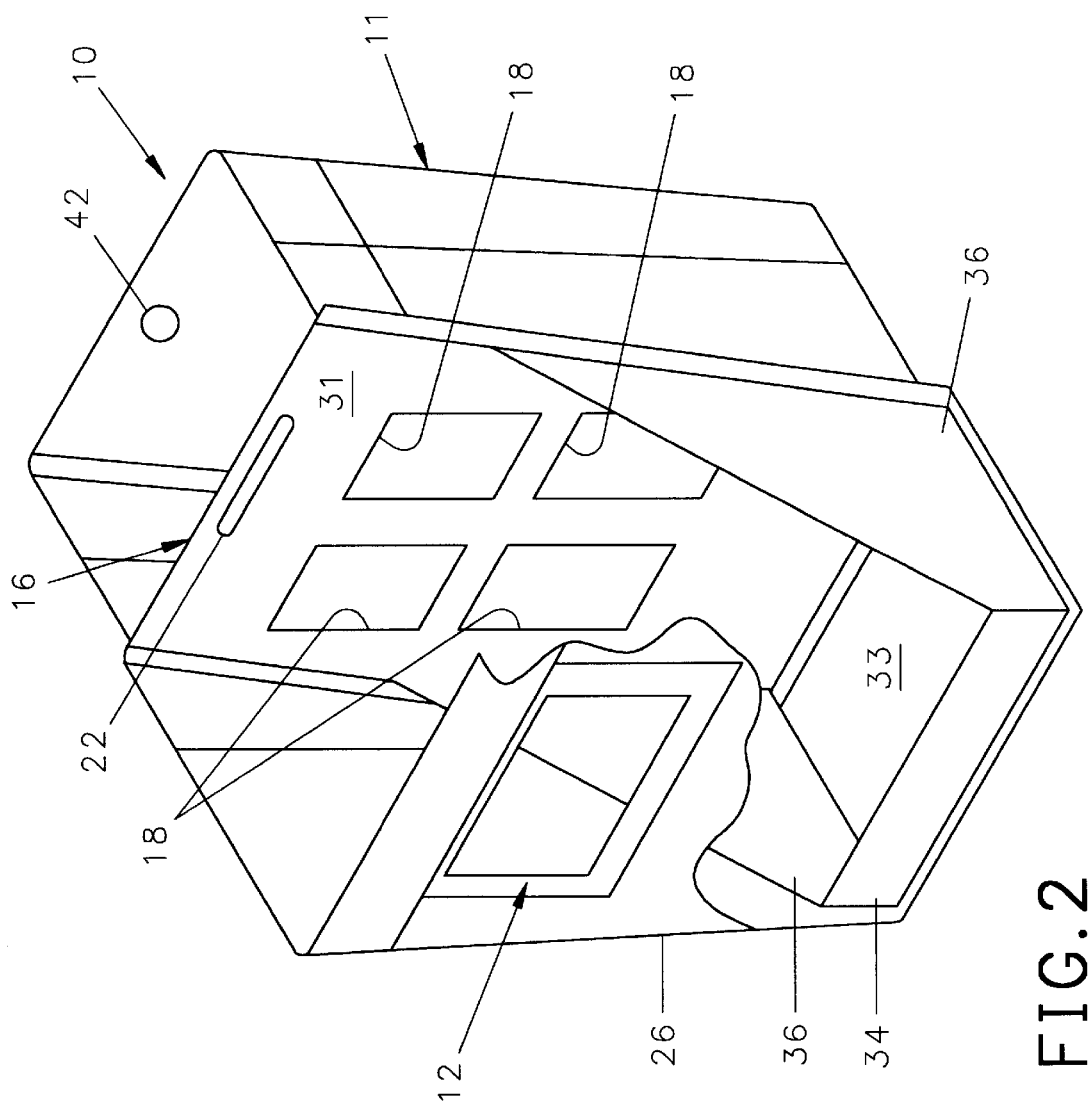
FIG. 2 is a perspective view, with portions cut away of the skimmer box showing the installation of a filter holder positioned in the front portion of the box.

Referring to FIGS. 1, 2 and 5, a skimmer filter assembly, generally indicated at 10, constructed in accordance with the present invention, includes a filter container or skimmer box, generally indicated at 11. Skimmer box 11 includes a front opening, generally indicated at 12, having an accordion pleat type weir 13, mounted on the inside thereof over the top of which water flows into the dirty or pre-filter portion of the skimmer box 11. On the outside of skimmer box 11, a non-toxic EPDM rubber liner 14 is anchored to the outside of opening 12 to provide a water tight seal between the liner 14 and the skimmer box 11. To clean the drain, one merely closes the bellows with the pump running causing all flow into the skimmer box to come through the drain. Water flowing through opening 12 and over weir 13 into the pre-filter or dirty portion of the skimmer box 11 flows through a net-like bag 15 (FIG. 5) that entraps large debris, fallen leaves, etc., therein. Silt or other solid debris matter coming over the top of weir 13 that is generally heavier than water falls through the water in skimmer box 11 and is in the filter mats and the removable sump 16 (FIG. 2). Pond water flowing over the weir 13 and through the net-like bag 15 thereafter preferably passes through a second net 15a containing biological material therein such as sold under the mark BIO BALLS or the like, and through the mat-like filter elements 17-17, preferably at least two in number, wherein particulate matter is entrained, blocked from passing through the filter mass, and where bacterial colonies attach themselves to the filter strands in the mats to remove nutrients in the water passing through the mat-like filters 17-17. After passing through the filters 17-17, the clean water passes through large windowpane-like apertures 18-18 in the back of the filter holder into the clean water or rear portion of the skimmer box 11.

The movement of water through the skimmer box is powered by a submersible pump 20 that rests on the bottom of the clean water or rear portion of the skimmer box 11. An alternate pumping technique utilizes a dry external pump with the suction line pulling water from the rear portion of the skimmer box. Pump 20 is electrically operated and is protected from running dry by a mechanically or pressure operated switch mechanism 21 that senses a low water level in the skimmer box 11 and shuts down the pump. Additionally, a water fill valve can be added to the filter box to add water as needed to replace evaporative losses. Water drawn through the pump 20 exits the skimmer box through outlet piping 21 preferably made of tubing sold under the trademark POLYPIPE or PVC pipe. A check valve 22 assures that water flows only one way through the skimmer box 11. Water flows up through outlet piping 21 and preferably through elbows 22, 23, outwardly of skimmer box 11. Thereafter, as is known in the art, the water flows through underground piping to the opposite end of the garden pond.

Figure 3C:
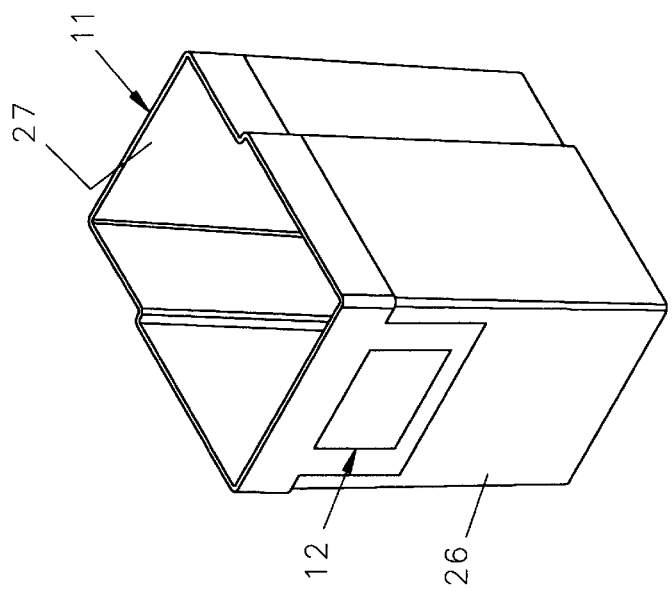
FIG. 3c is a perspective view of the skimmer box of the present invention.
Figure 3A:
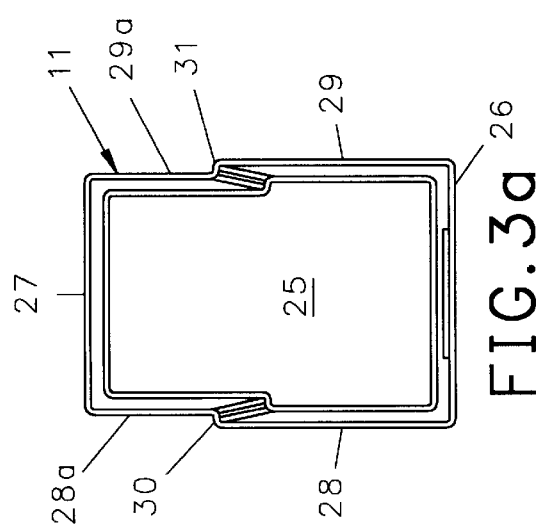
FIG. 3a is a top plan view of the skimmer box of the present invention.
Figure 3B:
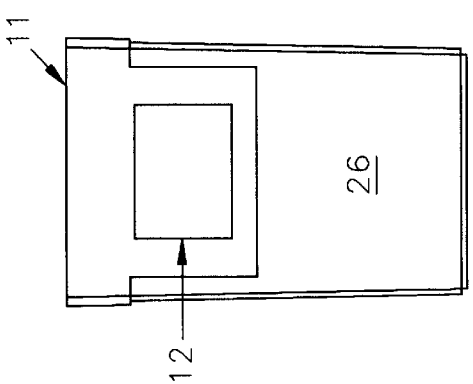
FIG. 3b is a front elevational view of the skimmer box.
Figure 4:
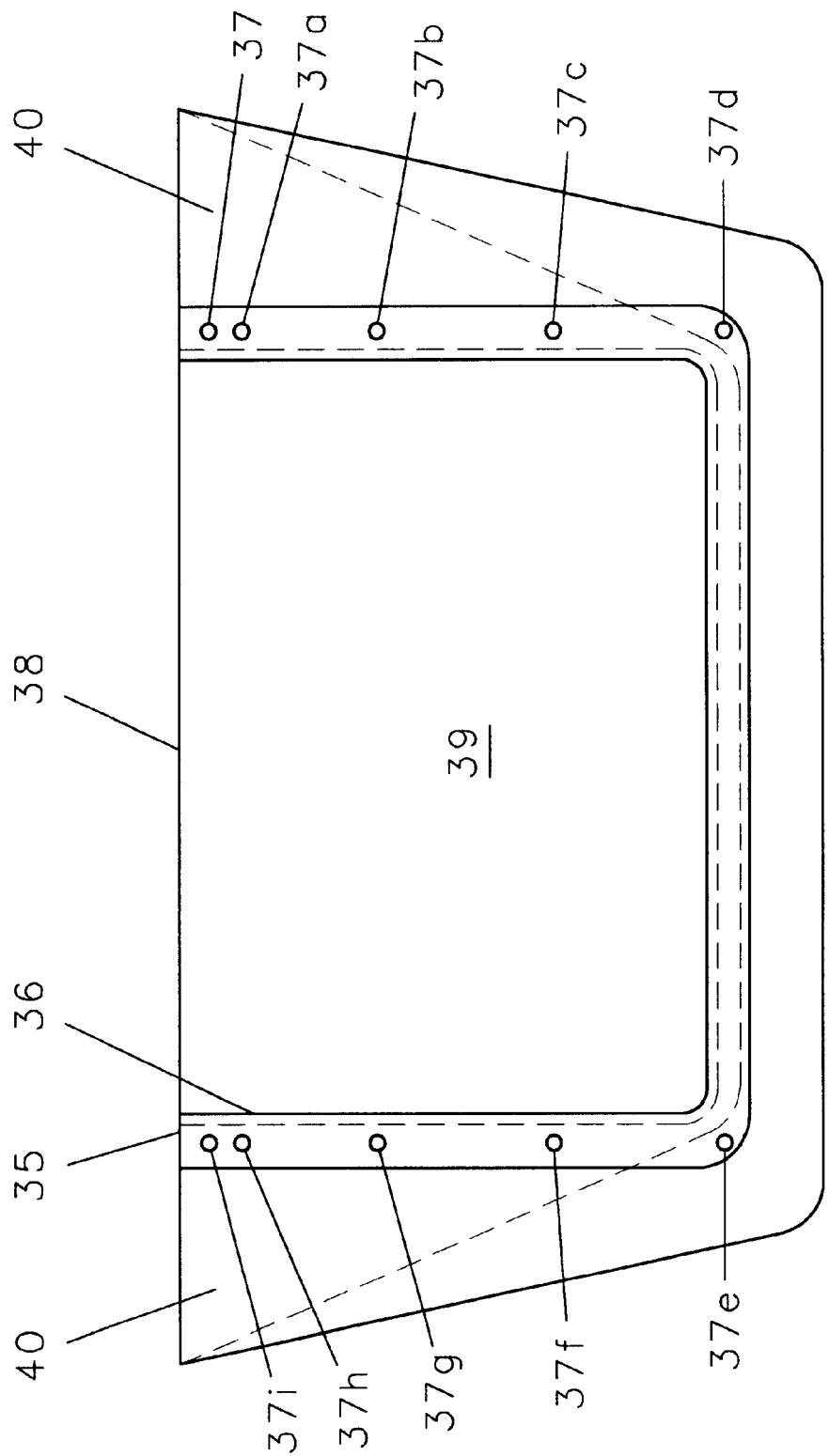
FIG. 4 is a front elevational view of the bellows and weir assembly constructed in accordance with the present invention.

Referring to FIGS. 3a–3c, skimmer box, generally indicated at 11, preferably made of polyethylene, fiberglass or the like, is a generally rectangular hollow structure and includes a bottom wall 25, front and back substantially vertical walls 26, 27, respectively, and a stepped or straight sidewalls 28, 28a and 29, 29a, respectively, all extending upwardly from the bottom wall 25 to define a generally rectangular hollow box and may have a wider front section and a narrower back section defined by a substantially centrally positioned vertical elongate step walls 30, 31, respectively In the preferred embodiment, the step walls 30, 31, are angled at approximately 84 degrees to the bottom wall 25 to provide a substantially vertical but slightly backwardly sloping pair of ridges or shoulders that will support and retain the filter mats 17, 17 thereagainst in the larger front or pre-filter portion of the skimmer box 11. This support function is clearly shown in FIG. 6. One example of dimensions for a skimmer box 11 are 14¼ inches and 13¾ inches wide in the front and back sections, respectively, 20¼ inches from front to back, and 22 inches in height. A two degree draft makes the dimension at the bottom of skimmer box 11 less than those mentioned above. Wall thickness is preferred to be ⅛ inch with an additional ½ 32ch reinforcement adjacent the top of the box and around inlet opening 12. One example of inlet opening 12 may be 8 inches wide and 5 inches high.

Referring to FIG. 2, while the filter mats 17-17 may be supported by stepped walls 30, 31, they may also be supported by the removable filter holder and dirty sump 16. The removable filter holder and dirty sump 16 includes a large back wall 31 having windowpane-like apertures 18-18 therein and a hand holdable slot 32 adjacent the top thereof that is grippable by a user to upwardly and outwardly slide the filter holder and dirty sump outwardly of the skimmer box 11, when cleaning and servicing of the skimmer box and filter mats 17-17 is required. Filter holder 16 also includes a bottom wall 33 extending forwardly of the bottom edge of back wall 31 and a shortened front wall 34 extending upwardly from the forward edge of bottom wall 33. The back bottom and front walls are enclosed by angled side walls 35, 36, respectively, which cooperate with the front wall 34 and back wall 31 to provide a hollow dirty particle collecting sump immediately above bottom wall 33 in which solid particles such as silt and other small debris heavier than water can collect.

One advantage of the skimmer filter 10 of the present invention is that the dirty forward portion of the skimmer box 11 may be removed, cleaned, and/or replaced without shutting down the filter pump 20 or draining the skimmer box 11 of water. Additionally, the slightly backwardly tilting rear wall 31 of the filter holder and dirty sump 16 allows the front wall 34 thereof to move backwardly as the filter holder 16 is pulled upwardly out of skimmer box 11 so that the front wall 34 clears the skimmer box weir 13 during removal. Likewise, the filter mats 17-17 of the present invention are preferably rectangular in shape and as a result of the improved structure of the skimmer box 11, mats 17-17 do not have to have apertures cut therethrough to provide for positioning the filters around sump piping 21, as is found in prior embodiments of skimmer filter boxes. As a result, irrespective of where water flows through the filter mats 17-17, the water pressure is constant across the filter mats and there are no weak spots where dirty water would be more likely to flow unfiltered (less pressure differential through apertures) such as are found in prior skimmer mats.

As indicated previously, the preferred six degree backward slope of the tall backside 31 of filter holder 16 is identical to that of the elongate step walls 30-31 of the skimmer box 11 and provide stable resting walls 30-31 which will hold substantially upright the filter mat 17-17 and yet bias them toward the upper back wall 31 in a stable position rather than position them perfectly upright where they might be unstable and tend to fall forward if any wave or current action should occur in the skimmer box due to turning on or off the pump 20. In the preferred embodiment, the windowpane-like apertures 18-18 in tall back wall 31 of filter holder 16 preferably made as large as possible in order to increase the active area of filter mats 17-17 and to provide the least restriction of flow of water between the pre-filter portion of the skimmer box 11 to the clean water portion of the skimmer box 11. Also, additional water treating media can be positioned in a second bio media net below the first debris net.

Referring to FIGS. 1, 4, 5 and 6, an accordion pleat-type weir generally indicated at 13 is mounted around the reinforced surround 12a of weir opening 12 on the front wall 26 of skimmer box 11. Accordion weir 13 is preferably made of rubber, plastic or the like which is thermally heat sealable or mechanically sealable at the outer and inner edges thereof to provide the accordion pleats in the weir structure. Weir 13 includes a generally U-shape base mounting portion 35 whose inner edge 36 is sized identically to the sides and bottom of the weir opening 12. The base flange 35 includes a plurality of mounting apertures 37, 37a–37i through which fasteners may be placed to sealably secure the base 35 to the outer wall of skimmer box 11. Silicone sealant or the like may be positioned between the liner 14 and the outside wall of skimmer box 11 to assure that all water entering the weir opening 12 passes over the top edge 38 of the back wall 39 of weir 13. As shown most clearly in FIGS. 5 and 6, the upper outer edges of the accordion pleats 40-40, 41-41 of weir 39 may be angled outwardly toward the top thereof to allow the top wall 38 of the top edge of the rear weir wall 39 to move upwardly and downwardly vertically in a hinge manner with respect to the bottom of the weir opening 12 depending upon the position of the upper water level in the skimmer filter relative to the weir opening 12. As shown most clearly in FIG. 1, the upper edge 38 of back weir wall 39 includes a flap 40 which extends over and around a float body 41. The float body 41 floats on the water level in the skimmer box 11. As that water level rises, float 41 tends to push the top of accordion weir wall 39 into a closed position with respect to the weir opening 12 in the front wall 26 of skimmer box 11. As the water level in the skimmer box 11 moves downward, float 41 moves downward and rearwardly such that the accordion shape weir provides a hingelike action around the bottom edge of skimmer box weir opening 12. At the same time, the side accordion pleats 40-41 seal the weir 13, thus preventing water from coming in the rectangular weir opening 12 and falling through the sides of the weir openings. In prior skimmer boxes, the lack of side sealing walls in skimmer box opening weirs allowed substantial, possibly a majority of the water entering the weir to avoid flowing over the back top edge 38 of the weir wall, and decreasing or eliminating the surface skimming action created by pulling the top surface of the pond over the weir. The accordion pleat side walls of weir 13 thus provide an improved directed flow of water coming through the rectangular opening 12 in the front of skimmer box 11. As shown in FIGS. 1, 5 and 6, the design of accordion pleat weir 13 provides that the upper edge 38 of back wall 39 is always the lowest upper surface of the weir. Thus, the accordion pleat weir constructed in accordance with the present invention, provides a superior entrance and more direct flow of water over the weir wall 38 and through the bag-like net 15 than provided in skimmer filters prior to the instant invention. The surface tension of the water flowing over the weir wall 38 acts to pull additional surface water over the weir wall providing a surface skimming action extending outwardly across the pond. Surface skimming per gallon of water pumped is improved over previous pond skimmers, thus maintaining a pond surface more free of debris. In prior skimmers, subsurface water leaked across the skimmer hinge and around the sides of the weir wall lessening the surface skimming action. Also, greater skimming efficiency allows one to use a smaller water pump than heretofore known. The use of a smaller pump, i.e., less than 3000 gal/hour, means that the water moves slower through the pond and has more time to react to the bacterial media positioned in filters. A cleaner pond is the result.

As shown most clearly in FIG. 1, the bolts or other fasteners (not shown) that are positioned through apertures 37–37h may also be positioned through similar apertures in the EPDM liner and front wall 26 to anchor a front plate 42 to sealingly secure the liner 14 against the front wall 26 of skimmer box 11. Preferably, the accordion pleat weir 13 is mechanically sealed in known manner to the inside surface of front wall 26 of skimmer box 11 to provide a complete water tight seal therebetween and still facilitate removal or replacement, if necessary.

Referring to FIGS. 1, 5 and 6, the rear or clean water portion of the skimmer box 11 pictured includes the narrower back portion of bottom wall 25, back wall 27 and the stepped portions 28a and 29a of side walls behind the elongate ridges or shoulders 30, 31, respectively in the side walls. As shown most clearly in FIG. 1, the lack of any vertical restrictions from the bottom to the top of the rear clean portion of skimmer box 11 allows mounting pump 20 in its upright normal position resting on the top of bottom wall 25. An exhaust tube or plastic piping 21 together with a check valve 22 extends upwardly from the exhaust of pump 20 to an elbow 22 which is fluidly sealingly connected with elbow 23 of piping outside the back of skimmer box 11 which, in a complete garden pond provides a return line for flow of water underground to the opposite end of the pond.

As shown in FIGS. 1, 5 and 6, the vertically uninterrupted space in the clean water portion of skimmer box 11 allows the pump 20 to be serviced, repaired, or replaced without moving or removing either the filter mat 17-17 the removable filter holder 16, the net-like bag 15. In prior skimmer boxes such as that shown in prior U.S. Pat. No. 5,584,991, the horizontal positioning of the filter mats and the positioning of a net-like bag on top of the filter mats requires that both of those items be removed prior to servicing or removal of the water recirculating pump in the skimmer box. Further, prior skimmer boxes provided for outlet piping to extend through the filter mats, thus requiring holes or apertures in the filter mats. Such discontinuities in the filter mats would provide areas of lower pressure where more water would flow through the hole in the filter mat per unit of time than through the filter mat itself. A construction of the skimmer box 11 and the construction of filter mat 17-17 in accordance with the present invention eliminates discontinuities in the filter mats and provides for more even and more efficient filtering of water flowing through the mats. While FIG. 2 discloses an aperture 42 in the back wall 27 of skimmer box 11 of the present invention, it should be noted that as shown in FIG. 5, the piping from the pump outlet may extend over an open top of the skimmer box 11, or through the aperture 42 as desired. Additionally, the movement of the prior filter mats from a horizontal position in the center or intermediate portion of the skimmer box allows any pump 20 to be utilized in the skimmer box in its normal vertical mounting position with its size only being restricted by the inside dimensions of the back portion of the skimmer box itself. In prior skimmer boxes, large pumps needed to be mounted in a horizontal position in order not to disturb the filter mats positioned horizontally in the skimmer box at a fixed location therein. Alternatively, the mats were removed and the large pump was used with only a net, thus foregoing the biological and fine particle filtering benefits of filter mats. Improvements in the skimmer box of the present invention eliminate the need for such forced horizontal and sometimes tortured positioning of submersible pumps utilized in the skimmer box, irrespective of the size or height of those pumps, especially when using a larger box having a weir opening which may approximate 16×7 inches.

Figure 7:
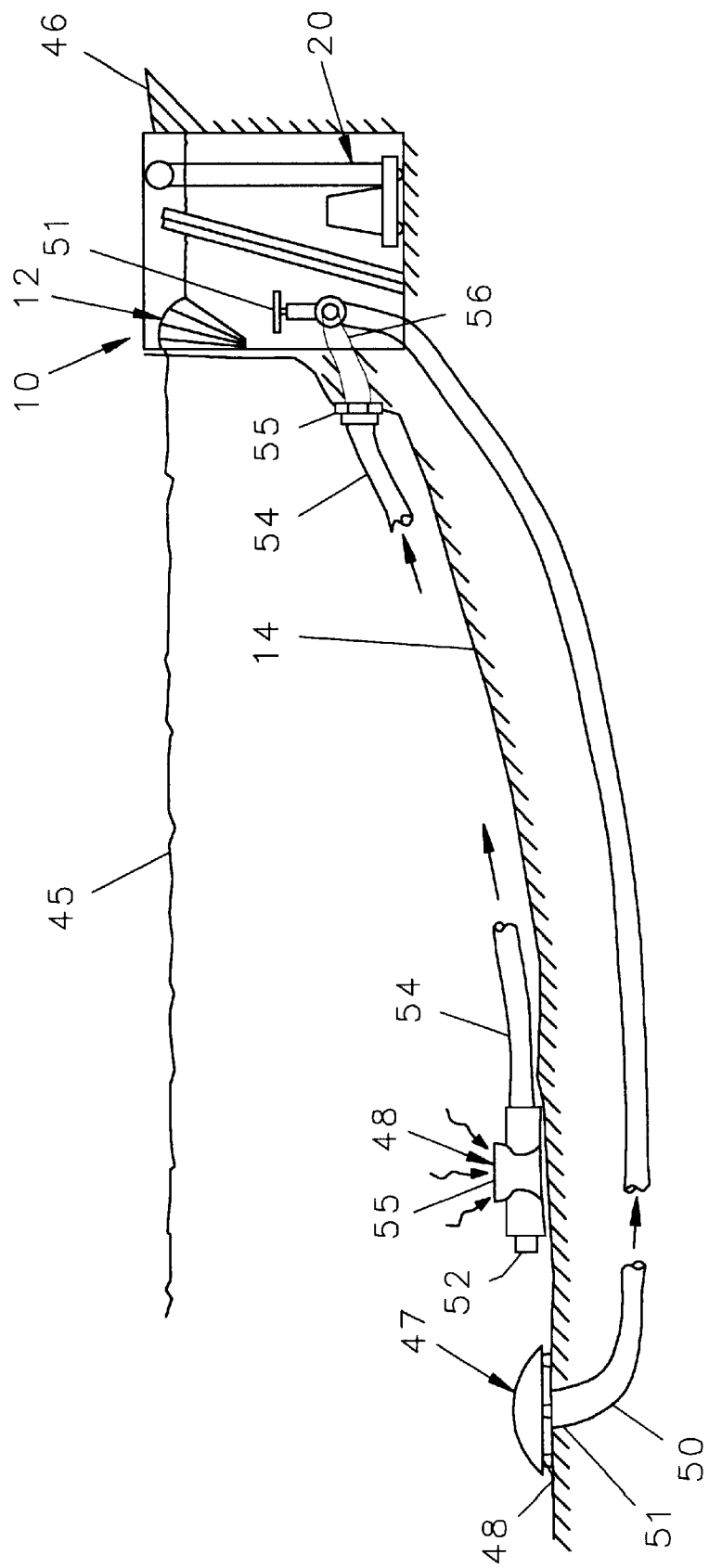
FIG. 7 is a detailed cross-sectional view of a pond and skimmer box constructed in accordance with the present invention showing two alternate pond drain configurations, a conventional drain under the pond liner and a second configuration mostly above the pond liner.

Referring to FIG. 7, the skimmer filter 10 constructed in accordance with the present invention is mounted in its position adjacent the edge of a pond having a water level 45 slightly below the ground level 46. The pond liner 14 defines the bottom of the pond as it sits on the ground 46. The weir 13 in the skimmer filter 10 brings materials floating on or near the surface of the pond 45 through the skimmer filter to clean the pond. However, some materials will eventually fall to the pond floor, escaping the skimmer box weir 13. Also, fish or other animal life in the pond may produce waste materials that may fall to the bottom of the pond. In order to provide means for collecting those materials that are not removed from near the pond surface by the skimmer filter 10, applicant has provided the pond shown in FIG. 7 with two alternative types of bottom pond drains, denoted generally at 47 and 48. In a typical bottom drain 47, an opening 49 is provided in fluid communication with piping 50 which extends through an aperture 51 in the bottom of the pond liner. The piping, PVC or poly pipe as previously disclosed, runs underground under the pond liner 14 back to the skimmer filter 10 where a two inch gate valve 51 may control the flow of water through pipe 50 into the skimmer filter 10. Thereafter, the water is filtered similarly to water flowing over the weir with the exception of not flowing through the net-like bags 15 or 15a. The drain disclosed in 47 should be installed prior to laying the pool liner 14 when the pool is built.

An alternative drain which may be utilized in new ponds as they are built or retrofitted into older ponds where a bottom drain has not been provided is shown at 48. The opening of drain 48 is a three inch PVC or poly pipe which is plugged at its far end 53 and connected at its near end 54 by a reducer to regular two inch poly pipe or PVC 54. A three inch snap-in drain may be positioned at the opening 55 of drain 48 and the three inch T may be rotated so the opening is at the verticalmost portion of the T as shown in the drawing in FIG. 7, or may be rotated 90 degrees clockwise or counterclockwise (not shown) so that the drain opening is slightly lower than shown in FIG. 7. The drain 48 is mounted on top of the lining and extends from adjacent the lowermost portion of the pond toward the skimmer filter 10. While it would be possible to have the connection of drain 48 extend over the edge of the pond liner 14, it is more convenient, and easier to hide from view, by passing the pipe 54 through a two inch bulkhead fitting 55 near the edge of the pond liner 14 adjacent the skimmer filter 10. The piping 56 then extends from the bulkhead fitting underground to the two inch gate valve 51 shown in connection with drain 47. It should be noted that as when the drain opening 48 or 55 of drains 47, 48, respectively, is positioned at a lower level in the pond than the gate valve 51, water may be siphoned by the pressure differential from the operation of the pump 20, even if a middle portion of the drain line 54 is positioned around the top edge of the pond liner 14.

The drain 48 will be covered by rocks which normally cover the pond liner 14 in any case. By opening or closing the gate valve 51, which is positioned low in the skimmer box 11 irrespective of the levels of the drain openings, the flow through the drains, either 47 or 48, may be controlled as desired. The use of both the skimmer filter 10 and bottom drains 47, 48 of the invention provide high-quality filtering of the water in the pond and lessen the amount of maintenance needed to keep the pond clear and clean.

The siphoning action from the drain opening 48, 47 to the gate valve 51 is caused by the pressure differential created in the skimmer filter 10 when the pump 20 pumps water outwardly of the clean rear portion of the skimmer filter 10 causing water from the dirty portion of the skimmer filter to flow through the various filter mediums 15, 15a and 17.

Since the pressure at gate valve 51 is higher in the upstream or dirty portion of the skimmer filter 10 than in the clean portion adjacent the pump inlet 20, water is siphoned from the drain openings 48 or 55 through the gate valve 51 into the dirty portion of the skimmer filter 10 through the filter element 17 into the clear portion by pump 20 out of the skimmer filter and to a higher positioned water fall (not shown).

While one embodiment of the present invention has been shown and described, it will be apparent to those skilled in the art that many changes and modifications may be made without departing from the true spirit and scope of the present invention. Therefore, the aim of the instant specification and the aim of claims to be appended to this application when it is filed in formal form is to cover all such changes and modifications as fall within the true spirit and scope of the present invention.

What is claimed:

1. A skimmer filter assembly for removing surface debris from a garden type pond comprising:

a hollow box-like structure made of moldable plastic material including a generally flat bottom wall having a periphery and a multifaceted sidewall extending upwardly from said periphery of said generally flat bottom wall completely therearound defining a front portion, opposing side portions and a back portion thereof, said front portion of said sidewall including a first aperture therethrough, vertically movable weir means mounted on an interior surface of said sidewall front portion across said first aperture for following a water surface of any pond on which the skimmer filter assembly is installed, said vertically movable weir means including means for preventing fluid flow through said first aperture except over the top of said weir means, said vertically movable weir means includes:

a weir wall of like shape to said first aperture including a generally horizontal top edge, float means positioned adjacent said top edge of said weir wall on a side thereof opposite said first aperture for maintaining said top edge of said weir wall at a water surface of any pond on which said skimmer filter assembly is installed, an accordion pleat border defining the periphery of said weir wall with the exception of said top edge thereof, said accordion pleat border being mounted adjacent said first aperture for sealing said weir wall thereto in watertight relation with the exception of said top edge.

2. The skimmer filter assembly as defined in claim 1 wherein said aperture is rectangular in shape, said weir wall is rectangular in shape and said accordion pleat border extends around the opposing sides and bottom of said weir wall.

3. The skimmer filter assembly as defined in claim 1 wherein said hollow box-like structure includes a rear pumping chamber positioned adjacent said back portion of said multifaceted sidewall, said rear pumping chamber being unobstructed from said flat bottom wall to a top of said sidewall for allowing any pump means assembly positioned therein to be removable through a substantially open top thereof without the removal of additional structures.

4. The skimmer filter assembly as defined in claim 3 further including, pump means resting vertically on said bottom wall of said rear pumping chamber, conduit means extending upwardly from said pump means, and third aperture means adjacent a top of said multifaceted sidewall for providing a passageway for said conduit means to exit said skimmer filter structure.

5. The skimmer filter assembly as defined in claim 1 further including, portable filter pad retaining means positioned on said bottom wall and extending upwardly therefrom mediate said front portion and said back portion of said multifaceted sidewall and extending from one of said side portions thereof across said box-like structure to the opposing side portion thereof to divide said structure into a front filtering chamber and a rear pumping chamber.

6. The skimmer filter assembly as defined in claim 5 wherein said filter pad retaining means includes a shallow open top box-like structure positioned on the bottom of said front filtering chamber for providing a removable sump therefor and a back wall thereof extending upwardly therefrom as a divider of said structure, said back wall including apertures therethrough for facilitating passage of any water therein from said front filtering chamber to said rear pumping chamber thereof, said back wall being slightly canted rearwardly at the top thereof for providing a rest for retaining any portable filter pads positioned thereon.

7. A skimmer filter assembly for removing surface debris from a garden pond comprising:

a hollow box-like structure including a generally flat bottom wall having a periphery and a multifaceted sidewall extending upwardly from said periphery of said generally flat bottom wall completely therearound defining a front portion, opposing side portions and a back portion thereof, said front portion of said sidewall including a first aperture therethrough, movable weir means having a vertical and a horizontal component mounted on an interior surface of said sidewall front portion across said first aperture for following a water surface of any pond on which the skimmer filter assembly is installed, said movable weir means including sealing means adjacent the bottom and sides thereof for preventing fluid flow through said first aperture except over the top of said weir means, said hollow box-like structure including a front filtering chamber adjacent said vertically movable weir means, said front filtering chamber including:

portable filter pad means made of foraminous material for removing solid particles from any water passing therethrough, and means on said hollow box-like structure for maintaining said portable filter pad means in substantially vertical orientation therein, said portable filter pad means aiding in dividing said hollow box-like structure into said front filtering chamber, and a rear pumping chamber.

8. The skimmer filter assembly as defined in claim 7 wherein said means on said hollow box-like structure for maintaining said filter pads in substantially vertical orientation therein include, detent means extending inwardly from opposing inside surfaces of said multifaceted sidewall mediate said front portion and said back portion thereof and canted rearwardly adjacent a top thereof for providing a stable rest for any portable filter pads positioned thereon.

9. The skimmer filter assembly as defined in claim 8 wherein said detent means include an opposed pair of narrow elongate bridging walls dividing a wider front filtering chamber from a narrower rear pumping chamber, said opposed narrow elongate bridging walls also dividing said opposed side portions of said multifaceted sidewall and extending from said bottom wall to the top of said multifaceted sidewall.

10. The skimmer filter assembly as defined in claim 7 wherein said rear pumping chamber is unobstructed from said flat bottom wall to a top of said sidewall for allowing any pump means assembly positioned therein to be removable through a substantially open top thereof without the removal of additional structures.

11. A skimmer filter assembly for removing surface debris from a garden pond of the type having a plastic lining material defining the boundary thereof, said assembly comprising:

a hollow box-like structure made of moldable plastic material including a generally flat bottom wall having a periphery and a multifaceted sidewall extending upwardly from said periphery of said generally flat bottom wall completely therearound defining a front portion, opposing side portions and a back portion thereof, said front portion of said sidewall including a first aperture therethrough, movable weir means having a vertical and a horizontal component mounted on an interior surface of said sidewall front portion across said first aperture for following a water surface of any pond on which the skimmer filter assembly is installed, said movable weir means including sealing means adjacent the bottom and sides thereof for preventing fluid flow through said first aperture except over the top of said weir means, said multifaceted sidewall includes a second aperture therethrough at a position below said first aperture, and said filter assembly further includes, bottom drain means positioned on top of any pond liner used in said garden pond, said bottom drain means including conduit means extending from said second aperture to a position adjacent the bottom of any pond on which said skimmer filter assembly is mounted for moving water from said bottom of said pond to said skimmer filter assembly, water inlet means at a distal end of said conduit means, and valve means adjacent said second aperture for controlling the flow of water from said conduit to said skimmer filter assembly, a pressure differential between said water inlet means and said second aperture, as mounted on a working ponds, providing automatic movement of water from adjacent said bottom of said pond to said skimmer filter and, said conduit means is positioned above any pond liner used in said pond and does not extend through said pond liner adjacent a bottom thereof.

12. The skimmer filter assembly as defined in claim 11 further including water pump means mounted in said box-like structure and said pressure differential is caused by suction from said water pump means.

* * * * *